United States Patent [19]

Palmer et al.

[11] Patent Number: 5,530,702

[45] Date of Patent: Jun. 25, 1996

[54] SYSTEM FOR STORAGE AND COMMUNICATION OF INFORMATION

[75] Inventors: John P. Palmer, Pomona; Anaikuppam Marudarajan, San Dimas; Joseph Tran, West Covina, all of Calif.

[73] Assignee: Ludwig Kipp, Palm Beach, Fla.

[21] Appl. No.: 251,522

[22] Filed: May 31, 1994

[51] Int. Cl.⁶ ........................................ H04J 3/16
[52] U.S. Cl. ...................... 370/85.3; 235/383; 235/385
[58] Field of Search ...................... 370/85.3, 60, 94.1, 370/18, 110.1, 61, 94.3, 85.2; 235/383, 385

[56] References Cited

U.S. PATENT DOCUMENTS

| | | | |
|---|---|---|---|
| 3,804,982 | 4/1974 | Brown | 178/69.5 |
| 3,819,012 | 6/1974 | Beck et al. | 186/1 A |
| 3,914,762 | 10/1975 | Klensch | 343/6.555 |
| 4,339,753 | 7/1982 | Mawhinney | 343/6.555 |
| 4,352,183 | 9/1982 | Davis et al. | 371/33 |
| 4,409,592 | 10/1983 | Hunt | 340/825.5 |
| 4,519,029 | 5/1985 | Thompson | 364/200 |
| 4,535,401 | 8/1985 | Penn | 364/132 |
| 4,538,262 | 8/1985 | Sinniger et al. | 370/85 |
| 4,543,654 | 9/1985 | Jones | 370/94 |
| 4,546,241 | 10/1985 | Walton | 235/380 |
| 4,554,446 | 11/1985 | Murphy et al. | 235/487 |
| 4,590,467 | 5/1986 | Lare | 370/94.1 |
| 4,593,281 | 6/1986 | Lare | 340/825.5 |
| 4,644,348 | 2/1987 | Gerety | 340/825.06 |
| 4,644,561 | 2/1987 | Paneth et al. | 375/9 |
| 4,646,090 | 2/1987 | Mawhinney | 342/44 |
| 4,646,295 | 2/1987 | Basile | 370/123 |
| 4,647,931 | 3/1987 | Mawhinney | 342/44 |
| 4,675,863 | 6/1987 | Paneth et al. | 370/50 |
| 4,677,614 | 6/1987 | Circo | 370/86 |
| 4,730,188 | 3/1988 | Milheiser | 340/825 |
| 4,777,591 | 10/1988 | Chang et al. | 364/200 |
| 4,792,018 | 12/1988 | Humble et al. | 186/61 |
| 4,862,160 | 8/1989 | Ekchian et al. | 340/825.54 |
| 4,872,014 | 10/1989 | Nowogrodzki | 342/351 |
| 4,926,415 | 5/1990 | Tawara et al. | 370/60 |

(List continued on next page.)

FOREIGN PATENT DOCUMENTS

| | | | |
|---|---|---|---|
| 0161779 | 11/1985 | European Pat. Off. | G01S 13/78 |
| 0285419 | 10/1988 | European Pat. Off. | G07C 9/00 |
| 0301127 | 2/1989 | European Pat. Off. | G01S 13/80 |
| 0405695 | 1/1991 | European Pat. Off. | G06K 7/00 |
| 0409016 | 1/1991 | European Pat. Off. | G01S 13/02 |
| 0494114 | 7/1992 | European Pat. Off. | G07C 9/00 |

OTHER PUBLICATIONS

F. Halsall, *Data Communications, Computer Networks and Open Systems* (1992), pp. 45–46.

Amendment after Final Rejection and Rule 132 Declaration By John P. Palmer Filed In Prosecution of U.S. Pat. No. 5,239,167 issued Aug. 1993.

Held, G. and Sarch, R., *Data Communications: A Comprehensive Approach*, (1989), pp. 69–70, 236–244.

Hennessy, J. and Patterson, D., *Computer Architecture: A Quantitative Approach* (1989), pp. 592–596.

*Primary Examiner*—Douglas W. Olms
*Assistant Examiner*—Shick Hom
*Attorney, Agent, or Firm*—Amster, Rothstein & Ebenstein

[57] ABSTRACT

A system and method for storage and communication of information between at least one first information containing terminal and a second terminal. The system and method includes generating a random number within the first terminal in response to receipt of a begin signal from the second terminal, and comparing the random number to a count incremented and maintained by a digital counter within the first terminal. When the random number is equal to the count, the first terminal transmits a request to transmit signal to the second terminal. If the second terminal responds with a first acknowledgment, the first terminal then sends an information containing signal to the second terminal. If the information containing signal is correctly received, the second terminal responds by transmitting a second acknowledgment which is received by the first terminal.

16 Claims, 4 Drawing Sheets

U.S. PATENT DOCUMENTS

| | | | |
|---|---|---|---|
| 4,941,123 | 7/1990 | Thompson | 364/200 |
| 4,964,053 | 10/1990 | Humble | 364/466 |
| 4,992,794 | 2/1991 | Brouwers | 342/51 |
| 5,005,125 | 4/1991 | Farrar et al. | 364/403 |
| 5,012,469 | 4/1991 | Sardana | 370/95.3 |
| 5,018,138 | 5/1991 | Twitty et al. | 370/94.1 |
| 5,041,826 | 8/1991 | Milheiser | 340/825.54 |
| 5,053,774 | 10/1991 | Schuermann et al. | 342/44 |
| 5,073,781 | 12/1991 | Stickelbrocks | 342/51 |
| 5,083,113 | 1/1992 | Slawinski et al. | 340/572 |
| 5,121,103 | 6/1992 | Minasy et al. | 340/551 |
| 5,148,404 | 9/1992 | Hilferink et al. | 367/2 |
| 5,151,684 | 9/1992 | Johnsen | 340/572 |
| 5,151,895 | 9/1992 | Vacon et al. | 370/85.1 |
| 5,166,676 | 11/1992 | Milheiser | 340/825.54 |
| 5,211,129 | 5/1993 | Taylor et al. | 119/3 |
| 5,218,189 | 6/1993 | Hutchison | 235/439 |
| 5,227,803 | 7/1993 | O'Connor et al. | 342/442 |
| 5,239,167 | 8/1993 | Kipp | 235/383 |
| 5,247,304 | 9/1993 | D'Hont | 342/44 |
| 5,270,717 | 12/1993 | Schuermann | 342/22 |
| 5,276,899 | 1/1994 | Neches | 370/60 |
| 5,287,113 | 2/1994 | Meier | 342/51 |
| 5,319,641 | 6/1994 | Fridrich et al. | 370/85.3 |
| 5,383,134 | 1/1995 | Wrzesinski | 364/514 |

SYSTEM FOR STORAGE AND COMMUNICATION OF INFORMATION

BACKGROUND OF THE INVENTION

This invention relates to multipoint communications systems which employ handshaking, random access and collision detection techniques, and more particularly to such systems where information must be received from a plurality of responding terminals. Specifically, the invention can be applied to a supermarket checkout system designed to reduce checkout time at the point of sale where, typically, many items are purchased by a customer.

Other possible applications of the invention include, for example, retail sales in general; delivery control; inventory control; security check of objects or beings occupying, or entering or leaving a defined area; automatic toll collection or monitoring of moving vehicles; telemetry; and network data communications in general.

Several approaches have been taken to implement communications systems which receive information from multiple terminals. In general, these can be referred to as transponder implementations, and communications protocols, including the Aloha technique, carrier sense multiple access with collision detection, and time division multiple access.

An advantage to using transponders is their relative simplicity. Transponders receive electromagnetic energy at a specific frequency from an interrogator and transmit back a signal which may be a continuous tone or an information-containing message such as an ID code. Typically, transponders do not permit sophisticated two-way communications, using a protocol, to enable the interrogator to coordinate or separate the responses from multiple transponders. Because of this, in applications where two or more transponders are identical and are located closely together, it may not be possible for the interrogator to determine the number of communicating transponders or to separate out communications from multiple transponders.

The Aloha technique provides one way in which multiple stations can share a communication channel over which only one transmission can be received at a time. Using the Aloha technique, when a station has information to transmit, it simply transmits it, without first being signaled that the communication channel is available. Because it is possible for more than one station to transmit at the same time, several transmissions may overlap or "collide," as it is called in the art. When a collision occurs, the network controller can either signal the station to retransmit its data or the network controller can simply drop the transmission and wait for the station to resend it. The principal disadvantage of the Aloha technique is that it can only be employed effectively when the likelihood of collision is very low, such as when the communication channel is idle most of the time.

One specific example of a system using the Aloha technique is found in U.S. Pat. No. 4,352,183 to Davis et al. In an effort to overcome problems in the most basic form of the Aloha technique, the system described in U.S. Pat. No. 4,352,183 employs a protocol for determining when a particular transmitter is allowed to transmit. A controlling transmitter first broadcasts an initial command signal to all the transmitters to indicate that a communication channel has become available. Each transmitter having data to send transmits a request for information transmission message to the controlling transmitter in a randomly chosen one of a predetermined number of timeslots following receipt of the initial command signal. If no collisions are detected, the controlling transmitter responds with an acknowledgment signal addressed to the particular transmitter that sent a request for information transmission message, thereby permitting that transmitter to send a data-containing message to the controlling transmitter. A disadvantage of this system is that the controlling transmitter must periodically issue command signals to indicate when a communication channel becomes available. Another disadvantage is that the controlling transmitter must issue a command signal addressed specifically to the requesting transmitter before that transmitter is permitted to send a data-containing signal.

The carrier sense multiple access with collision detection protocol provides a way of reducing collisions between transmissions in more heavily utilized networks. This protocol is well-known in the art and has evolved into an industry standard: IEEE Standard 8802.3-1992, Information Technology—Local and Metropolitan Area Networks—Part 3: Carrier Sense Multiple Access with Collision Detection (CSMA/CD) Access Method and Physical Layer. Specifications, Institute for Electrical and Electronics Engineers, Piscataway, N.J. 08855-1331.

Under this protocol, multiple stations can respond to the same interrogator, hence the name multiple access. However, before attempting to transmit, each station monitors the channel to determine if another station is communicating (i.e. the station senses the presence of a carrier frequency), hence the name, carrier sense, and if so, waits for the other station to finish transmission before attempting to transmit information. The interrogator responds according to whether or not two or more stations attempt to transmit simultaneously (i.e. collision detection). A disadvantage of this protocol when applied to systems where a single device interrogates a large number of stations simultaneously is that collisions are frequent and throughput low because several stations attempt to transmit whenever the channel is found to be available.

Another protocol, time division multiple access, has been used in multipoint communication systems. Under this approach, each station is assigned, based on its own unique identifying characteristics, one of a predetermined number of timeslots in which to transmit. To complete longer transmissions, each station communicates during its assigned timeslot over multiple cycles. A problem with this approach is that the interrogator must be able to distinguish between the responding stations prior to requesting data from them in order to assign an individual timeslot to each.

European Patent Application EP 0 409 016 A2 describes a system for locating predetermined labeled objects. An interrogator has a narrow beamwidth antenna for transmitting an energizing signal at a predetermined first frequency. A transponder incorporated in the label on each of the labeled objects receives the energizing signal and transmits a return signal at a predetermined second frequency. The energizing signal incorporates a predetermined transponder identification code. If the predetermined transponder identification code matches the identification code stored in the transponder, the transponder transmits a return signal.

The system of EP 0 409 016 A2 may also be used to locate objects within a predetermined category of a plurality of objects. In this mode, the interrogator transmits a predetermined category code to all of the transponders, and waits for receipt of signals containing an identification code from each of the transponders which have a stored category code which matches the predetermined category code that was transmitted. To assist in avoiding collisions between their signals when responding, each transponder waits after energization for a predetermined delay period before responding, the length of the delay period being determined from a code stored in the transponder's memory.

A disadvantage of the system of EP 0 409 016 A2, where used with a large number of objects to be identified, is the need for the interrogator to be cognizant of the transponder identification codes a priori; that is, in advance of any communications made by the transponder. Another disadvantage of the system, where used with a large number of objects, is the need to store a predetermined time delay code in each transponder which is distinct from all the other time delay codes of transponders belonging to the same category. In general, this characteristic can be expected to increase the total time required to locate a subset of the objects in a category because many of the possible time delay codes of the category will be unused.

European Patent Application EP 0 494 114 A2 describes a supermarket checkout system having an interrogator and a plurality of transponders, each transponder being attached to an individual object to be identified. In that system, an interrogation signal is first transmitted by a central interrogator to all of the transponders. On receipt of the interrogation signal, each transponder transmits a response identifying the particular transponder. Without waiting for further communication from the interrogator and at intervals which are determined randomly or pseudo-randomly by circuitry within each transponder, each transponder repeats its identifying response two more times in succession to increase the probability of successful reception of its response by the interrogator.

That system further describes use of an interrogation signal which can be modulated intermittently with the identification code of a particular transponder, or with a code identifying a category of transponders, so as to cause to respond only the particular transponder or category of transponders which have the same identification code or category code stored in the particular transponder's memory. Identification codes are transmitted and received digitally with error correction and detection bits to improve the chances that the interrogator determine when it has received a response correctly from a transponder.

Under the system of EP 0 494 114 A2, if the interrogator receives a response from a transponder correctly, the interrogator signals the same to the transponder by momentarily interrupting the interrogation signal. The transponder is adapted to sense the interruption of the interrogation signal and stops transmitting its response under such conditions.

A problem of the system of EP 0 494 114 A2, where used with multiple objects to be identified, is that the response signals can be expected to always collide during the first transmission because they are timed to be sent by all transponders immediately on receipt of the interrogation signal. Thus, under this system the response signals during the first transmission can generally be expected to be received in error. Unnecessary delay and possibly undetected errors may result from a system the operation of which is conditioned on detecting errors in the responses of multiple transponders which are all intended to be transmitted simultaneously. Another problem of this system, where used with large numbers of objects to be identified, lies in the lack of an affirmatively granted transmission time for each transponder to respond. Although each transponder is adapted to repeat its response signal, the system is not designed to ensure that each transponder has a time to transmit which is distinct from the times that all other transponders are transmitting, as might be the case if the interrogator were to affirmatively signal the individual transponder that a transmission time had been granted.

SUMMARY OF THE INVENTION

Accordingly, it is an object of the present invention to provide a method by which the identifying information from a large group of data terminals can be received intelligibly and efficiently over a single communications medium without having to address each data terminal individually or distinguish between them prior to receiving the identifying information.

Another object of the invention is to provide a method by which a network controller can indicate to the transmitting data terminal the positive success of receiving a communication.

A further object of the invention is to provide a method by which the network controller can signal a specific requesting, but as yet unidentified, data terminal that it is ready to receive the identifying information from the particular data terminal.

Another object of the invention is to provide a data terminal embodied in a radio frequency identification tag (RFID tag) which can receive, store and transmit identifying information to and from a network controller using a serial wireless radio frequency method.

Still another object of the invention is to provide an RFID tag which is inexpensive and easy to manufacture.

A still further object of the invention is to disable the RFID tag following successful communication with the network controller.

It is a specific object of the invention to provide an RFID tag which can be attached conformably to articles of varying shapes and sizes and which can be used in a supermarket checkout system to permit rapid checkout of items contained in the supermarket checkout cart.

Still further, it is an object of the invention to provide an RFID tag which can be used in the applications such as retail sales in general, delivery control, inventory control, surveillance, telemetry, automatic toll collection and monitoring of moving vehicles, and tracking, where the use of such tags can be effectively employed.

These and other objects of the invention are obtained through a method of communicating between a network controller and a plurality of data terminals. Data terminals are first initialized in response to receipt of a "begin" signal broadcast from the network controller. Within each data terminal a random number is then generated and a counter is incremented in response to the passage of successive time periods. During successive time periods the random number is compared with the count maintained by the counter. When the random numbers and the count in a particular data terminal are equal that data terminal is ready to transmit information to the network controller. Accordingly, that data terminal transmits a "request to transmit" signal to the network controller. Upon receipt of a "request to transmit" signal, the network controller broadcasts a first acknowledgment signal to all the data terminals. If a data terminal receives a first acknowledgment signal from the network controller within a predetermined time period after transmitting the request to transmit signal, that data terminal concludes that it has been given permission to transmit and therefore transmits a data-containing signal: for example, a signal identifying the data terminal.

In the preferred embodiment, the network controller transmits a second acknowledgment signal from all the data terminals if it determines that it has received a data-containing signal successfully. If a particular data terminal does not receive a second acknowledgment signal within a predetermined time period after transmitting a data-containing signal, the particular data terminal transmits again a data-containing signal. Alternatively, if the second acknowledgment signal is received within the predetermined time period, communication is terminated. Communication is also terminated if, after initialization, the data terminal neither receives a first acknowledgment signal nor a second acknowledgment signal from the network controller within a predetermined time period. Once the data-containing signals are received successfully from all the data terminals, the network controller broadcasts a third acknowledgment signal to all the data terminals. Each data terminal is powered off and disabled from further communication if it receives a third acknowledgment signal from the network controller after it receives a second acknowledgment signal within the predetermined time period after transmitting a data-containing signal as described above. Preferably, each data terminal is also capable of being powered on by a signal from the network controller, which in some applications, may contain the energy necessary for the data terminal's operation. In other applications, the data terminal may be powered by a battery or other power source.

In the preferred embodiment, if a data terminal does not receive a first acknowledgment signal within a predetermined time period after transmitting a request to transmit signal, that data terminal generates a new random number and begins a new attempt to communicate with the network controller, that data terminal interpreting the absence of the first acknowledgment signal as the failure to obtain permission to transmit at that time from the network controller. On the other hand, if a data terminal receives the first acknowledgment signal prior to transmitting the request to transmit signal, incrementing of that data terminal's counter is suspended temporarily. In this way, incrementing of the counters in all of the data terminals is suspended except in the one data terminal which has timely received a first acknowledgment signal from the network controller in response to a request to transmit. Suspending the other data terminals in this way assists the data terminal which has been given permission to transmit its data-containing signal at a time when other data terminals are not attempting to transmit. Afterwards, when the network controller receives the data-containing signal and transmits the second acknowledgment signal, incrementing of the counter in all the data terminals where it was suspended temporarily is resumed again.

In another preferred embodiment a type code is incorporated in a command signal broadcast from the network controller prior to initiation of the random delay in the data terminals. Each data terminal compares the type code which is received from the network controller to a type code stored in the data terminal's memory. If the two match in a particular data terminal, that data terminal begins the communication sequence described above. In this way, stored information can be retrieved from data terminals belonging only to a certain group at a time, a function which may be advantageous in avoiding transmissions of the data terminals from colliding. However, if the received type code and the stored type code do not match in a particular data terminal, that data terminal is powered off until again powered on by a subsequent power-on signal from the network controller.

Preferably, the data terminal is embodied in an RFID tag which:

is attached conformably to articles;

is adapted to communicate with the network controller through serial wireless radio frequency (RF) transmission;

is adapted to receive the energy necessary for its operation from a battery, or alternatively, from a wireless RF transmission from the network controller; and is adapted to transmit a data-containing signal which includes an article identification code identifying the article to which it is attached, the article identification code being read from memory located within the RFID tag.

The thus-adapted RFID tag embodiment of the data terminal is suitable for use in a supermarket "Checkout System," such as that disclosed in U.S. Pat. No. 5,239,167. For such use, RFID tags (each having a data terminal) are attached conformably to articles held for sale in a supermarket. The RIFD tags may be conformably attached to the articles by a variety of conventional ways, such as by sewing, gluing or by lamination within the packaging of the articles. The purchaser loads up a shopping cart with the tagged articles to be purchased, and moves the cart into an enclosure at the point of sale which is appropriately shielded from the entrance or escape of radio-frequency emissions.

For the supermarket checkout system where RFID tags are not battery powered, inside the shielded enclosure, a network controller transmits a power on signal having a high energy content to all the RFID tags attached to articles situated within the enclosure. The RFID tags receive and store the energy in an energy storage capacitor provided in each RFID tag. Once the accumulated voltage across the capacitor exceeds a predetermined threshold, the individual RFID tag is ready to receive communications from the network controller. The network controller then transmits a begin signal to initiate communication with all the RFID tags attached to articles situated within the enclosure. Following the communication methods described above, an article identification (ID) code is received by the network controller for each RFID tagged article located within the shielded enclosure.

Preferably, a central supermarket computer attached to the network controller is programmed to retrieve product information such as name, brand, size, weight, etc. associated with the article ID code and to output the same to a display located outside the shielded enclosure. The same product information can also be output to a printer outside the enclosure for generation of a checkout invoice. The enclosure may preferably be provided with a scale for registering the combined weight of articles in the shopping cart, such as is described in U.S. Pat. No. 5,239,167. The supermarket's computer can then determine if all the article ID codes have been registered successfully by comparing the combined weight of the articles in the cart to the computed weight of the articles which have been successfully identified.

Once ID codes have been successfully received for all tagged articles, the network controller transmits a final (third) acknowledgment signal to the RFID tags, signaling the successful receipt of the article ID codes and permanently disabling the RFID tags from attempting to communicate further. The computer then permits the door of the shielded enclosure to be opened, and the cart containing the articles is permitted to be removed by the customer. Near the exit of the supermarket, a security check is made, which can be accomplished through interrogation by another network controller. The security check need only determine if any RFID tags in the customer's control are in the communication-enabled active state. If such is the case, an alarm is sounded by the interrogating device to alert store personnel.

The thus-adapted RFID tag embodiment can also be used in conjunction with a network controller for delivery control or inventory control purposes. In such cases, the network controller preferably will selectively interrogate a group of RFID tags attached to articles by incorporating a type code in a command signal broadcast to all RFID tags within the range of the network controller transmitter. A computer connected to the network controller can then be used, in the delivery control application, for example, to automatically increment, or decrement the present inventory tally, and update shipping records. Similarly, in the inventory control application, the network controller can be used with a computer to generate and update inventory records in real time, if desired.

DESCRIPTION OF THE PREFERRED EMBODIMENT

Figure 1:
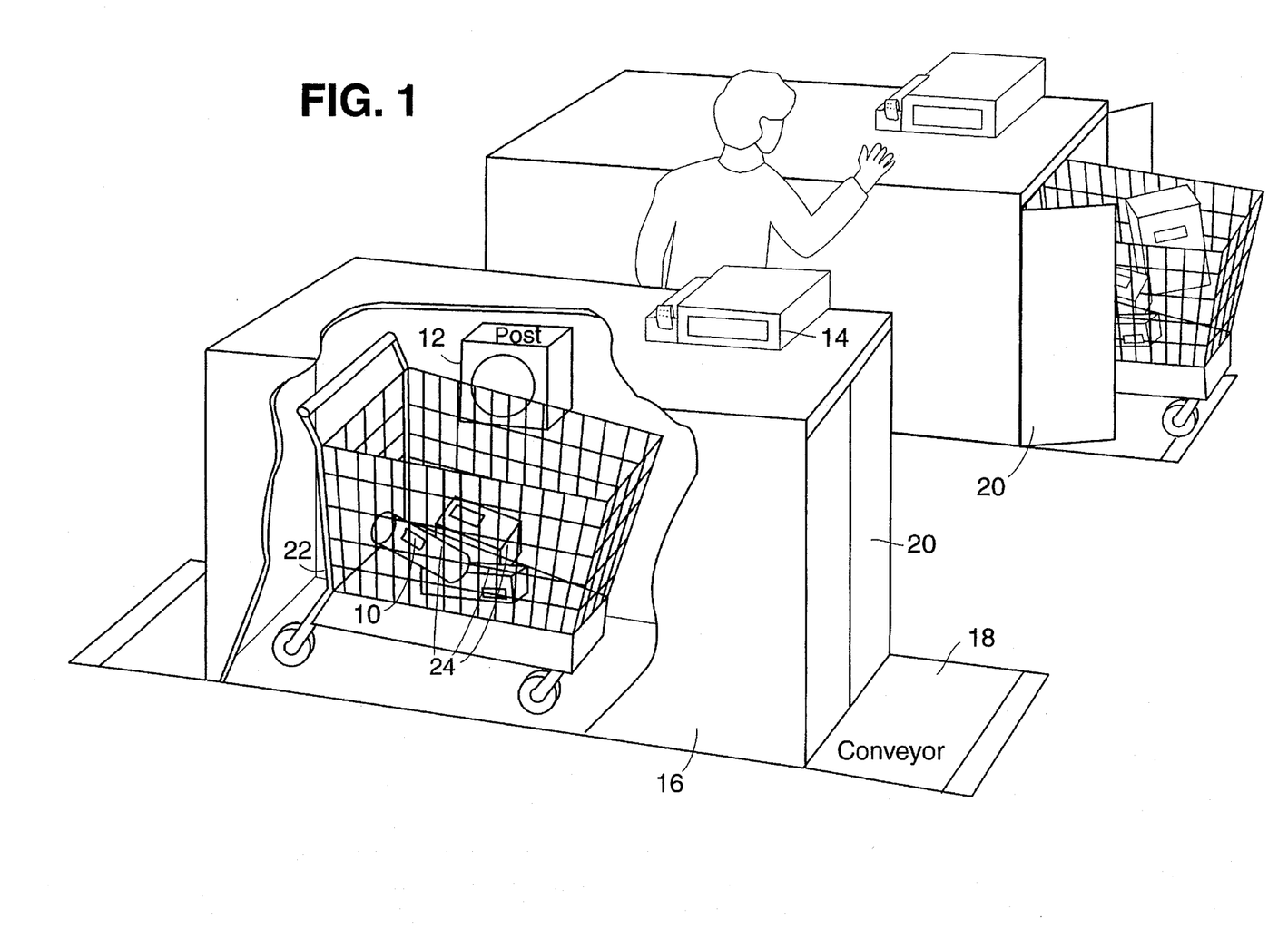
FIG. 1 is a perspective view of a supermarket checkout system employing an RFID tag embodiment of the data terminal of the present invention.

Referring to FIG. 1, the data terminal of the present invention as embodied in RFID tags 10 is shown in use as part of a supermarket checkout system. As shown cart 22 holding randomly disposed articles 24 to which RFID tags 10 (each having a data terminal) have been conformably attached is moved into an RF shielded enclosure 16 via a conveyor 18 mounted below the enclosure. An external network controller 12 of the type generally called a Point of Sale Terminal (POST), described below, is located inside the enclosure. A display and printer 14 displays the item and/or price and prints a record for the customer, as is well known in the art. In general, the POST transmits a high energy content transmission signal to power up the RFID tags. The POST then broadcasts a 'BEGIN' signal to all the RFID tags to stimulate the tags to initiate a communication sequence which will ultimately result in the transmission of article-identifying information (an article ID code) from each of the RFID tags to the POST. As will become apparent from the description of the data terminal operation to follow, a communication protocol determines the priority of and scheduling of signals back and forth between the data terminal and the POST 12 such that the POST 12 correctly receives the article-identifying information from each of the data terminals.

Figure 2:
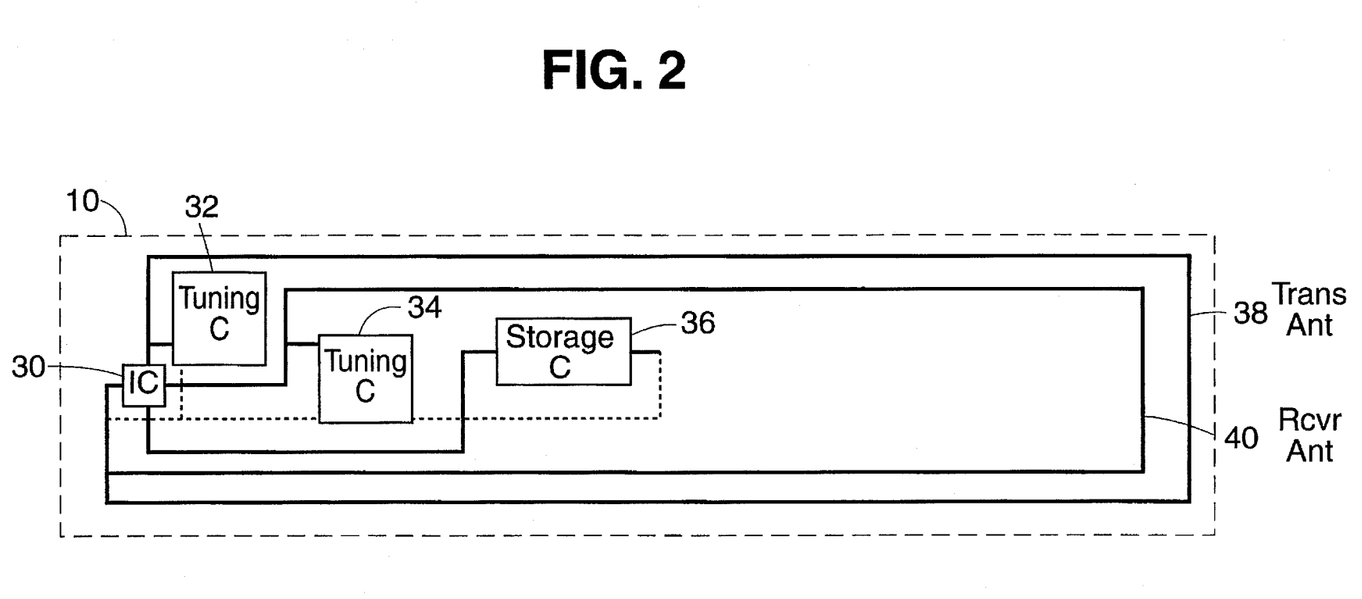
FIG. 2 is a physical component diagram of the RFID tag.
Figure 3:
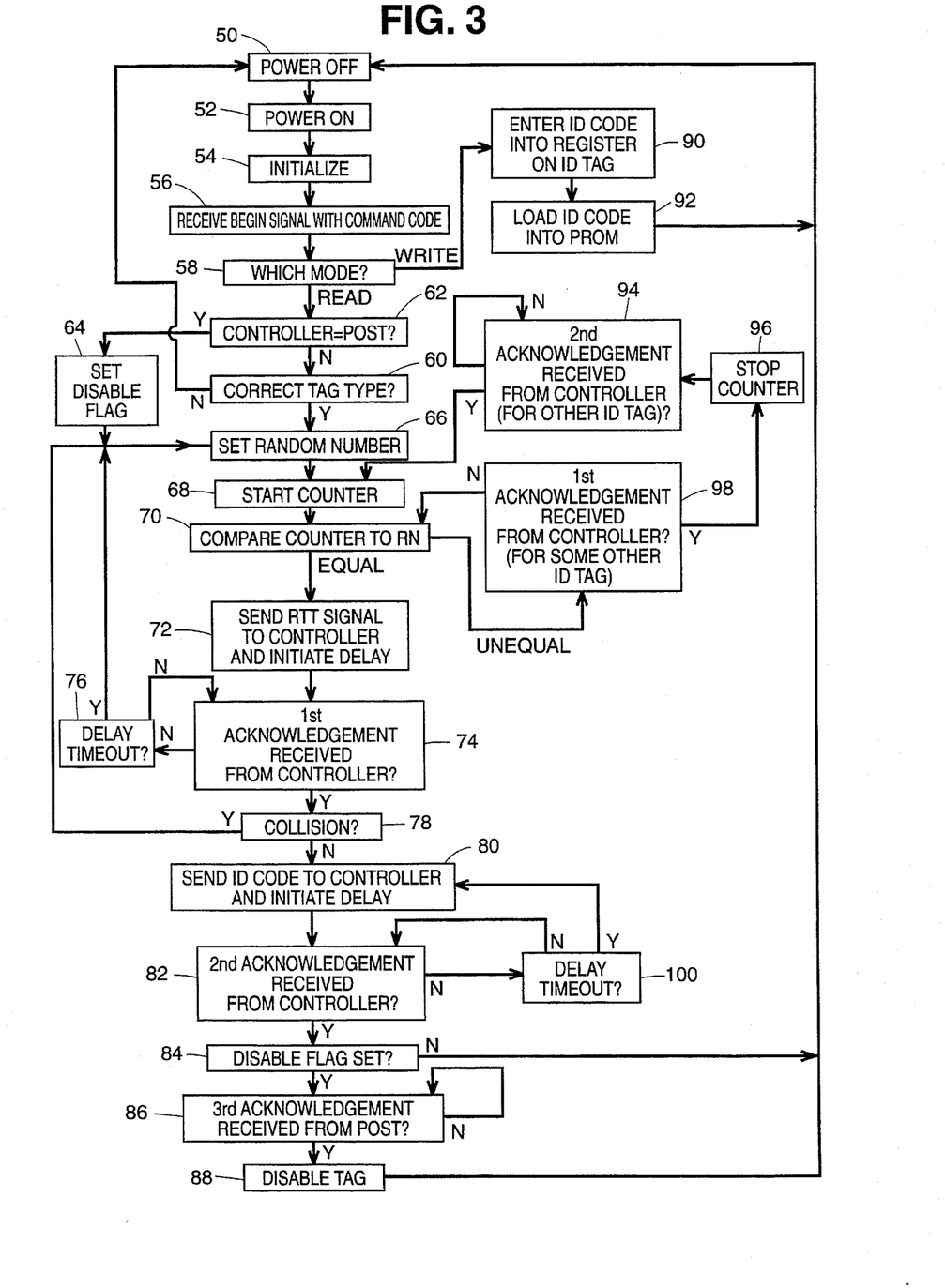
FIG. 3 shows a flowchart of operations for the RFID tag embodiment.

Referring to FIGS. 2 and 3, the RFID tag remains in a normally powered off condition 50 until powered on 52 and initialized 54 in response to receipt of a high energy content transmission broadcast by the network controller to all the RFID tags. When the RFID tag 10 receives the high energy content transmission from the network controller on receiver antenna 40, a voltage is accumulated across the terminals of energy storage capacitor 36. When the voltage exceeds a threshold value, a RESET signal is generated within the RFID tag to initialize 54 the digital circuitry of the integrated circuit (IC) 30 to predetermined states. The methods and structures by which a high energy content transmission can be received by an RFID tag will be appreciated by persons skilled in the art. After initialization, the RFID tag remains idle until a BEGIN signal containing a command code is received 56 from the external network controller 12.

The command code is comprised of several portions which convey various information to the RFID tag. A portion of the command code indicates to the RFID tag that the command originated from a POST. Another portion of the command code indicates whether article-identifying information is to be read from (READ mode) or written to the RFID tag (WRITE mode). Still another portion of the command code contains a type-identifier which is used by the individual RFID tag to determine whether it belongs to the group of tags which are addressed by the particular command.

When READ mode is indicated 58 by the command code, the portion of the command code which indicates the origin of the command (i.e. POST) is examined 62 by circuitry within the particular RFID tag. If the command code is from a POST a disable flag is raised 64 which sets the particular RFID tag to be permanently disabled at the conclusion of the communication with the POST. If the command is not from a POST, the RFID tag determines if the type-identifier contained in the command code matches, 60, the type-identifier stored in memory within the RFID tag. If the command is from a POST, or if the received type-identifier matches, 60 the stored type-identifier in a particular RFID tag, the communication sequence is allowed to proceed for that tag. If the command is not from a POST and the two type-identifiers do not match, the RFID tag is powered off again, 50 and remains in a powered off state until powered on again by receipt of a high energy content transmission as described above.

Figure 4:
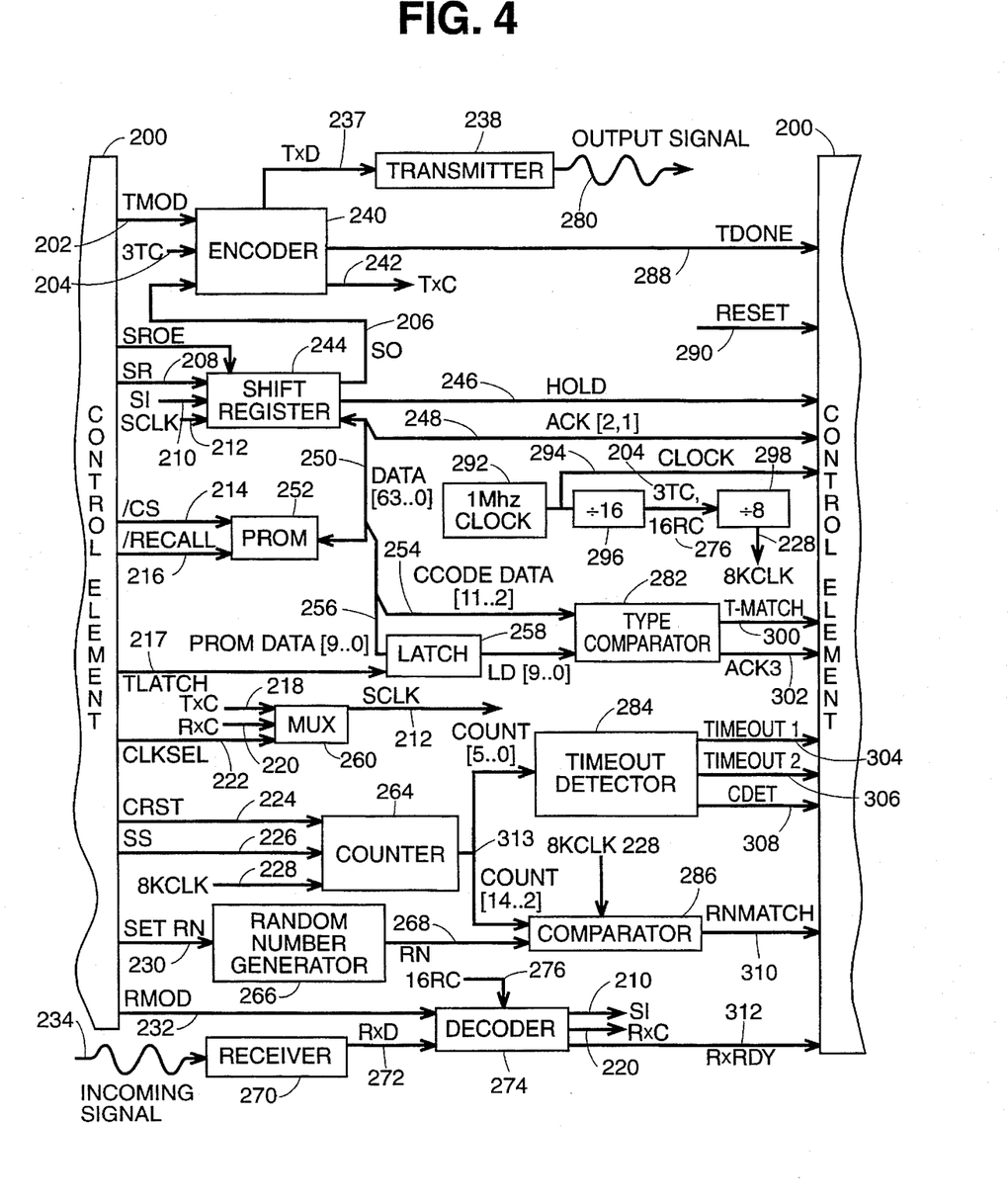
FIG. 4 is a block diagram of the RFID tag embodiment.

With reference to FIG. 4, each RFID tag has a random number generator 266 and a digital counter 264 responsive to a local clock signal 8KCLK, 228, within the RFID tag. Counter 264 is reset at the time of initialization. Those RFID tags whose type-identifiers match the type-identifier in the command code received from the network controller or which are in communication with a POST, proceed with the following communication sequence. Referring back to FIG. 3, the random number generator 66, delivers a random number to be held for comparison 70 with the output of the digital counter. When the random number has been generated, the counter begins counting up 68 towards the random number with the passage of successive time periods. When the output of the counter and the random number are EQUAL, 70, in a particular RFID tag, that RFID tag transmits, 72, a request to transmit signal (RTT) to the external network controller 12 to request permission at that time to begin transmitting its data. It will be appreciated that the request to transmit signal, RTT, is a generic signal which can be the same for all requesting RFID tags, as the RTT signal does not identify the particular requesting RFID tag.

The requesting RFID tag then waits, 74, for a first acknowledgment signal from the external network controller. A delay count is initiated from the time the request to transmit signal is transmitted by the RFID tag. If the first acknowledgment signal is received by the requesting RFID tag before the delay count reaches a value indicating that a predetermined time period has been exceeded, 76, i.e., before the delay counter "times out", then the requesting RFID tag determines next whether a collision has occurred, 78. If the first acknowledgment signal is not received by the requesting RFID tag within a predetermined time period after transmission of the request to transmit signal, the delay counter times out, 76, which indicates to the requesting RFID tag that the external network controller did not receive the RFID tag's request to transmit signal correctly. Receipt of the first acknowledgment signal by the RFID tag too early after transmission of the request to transmit signal indicates to the RFID tag that a collision has occurred, 78, in that the first acknowledgment signal had been an intended response to some other RFID tag which had sent a request to transmit signal. In either case, receipt of the first acknowledgment signal too early or too late with respect to when the request to transmit signal is sent causes the requesting RFID tag to generate, 66, a new random number, to reset and restart its counter, 68, and to reinitiate the above-described communication sequence with the network controller.

Receipt of the first acknowledgment signal by the RFID tag within the predetermined time period permits the RFID tag to perform the next step of the communication sequence, that of transmitting a data-containing signal: for example, transmitting, 80, the article ID code to the external network controller. After a particular RFID tag transmits, 80, its article ID code to the network controller, the RFID tag then waits for receipt, 82, of a second acknowledgment signal from the network controller which signifies that the ID code was received. A delay count is initiated in the particular RFID tag from the time that the article ID code is transmitted. If the second acknowledgment signal is received, 82, from the network controller before the delay count reaches a value indicating the passage of a predetermined time period and times out, 100, then the particular RFID tag concludes that its transmission of the ID code has been successful.

The RFID tag then checks again to determine whether it is communicating with a POST type network controller, as is the case if the disable flag has been raised, 84, in the particular RFID tag. If the disable flag has not been raised, the RFID tag powers itself off, 50, to await the next command from the network controller. If the disable flag has been raised, the particular RFID tag then waits for receipt, 86, of a third acknowledgment signal from the POST which signifies that all RFID tags have been read successfully. Once the third acknowledgment is received from the POST the RFID tag disables itself permanently from further communication, 88.

Since the communication protocol relies on broadcast transmissions between the RFID tags and the external network controller which do not identify the particular RFID tag, a particular RFID tag may receive communications from the network controller that were not intended for it. Should the first acknowledgment signal be received by a particular RFID tag before that tag has transmitted, 98, a request to transmit signal, but after the counter in the particular RFID tag has begun incrementing, then that RFID tag concludes that the first acknowledgment was intended for some other RFID tag which has been given permission to transmit. The counter of the particular RFID tag is therefore halted temporarily, 96, to permit the RFID tag having permission to transmit to complete transmission of its data-containing signal to the external network controller. Only after the second acknowledgment is sent by the external network controller and received, 94, by the halted RFID tag does the halted RFID tag resume incrementing, 68, its counter again. It will be appreciated that the first acknowledgment signal will generally cause all of the RFID tags to be temporarily halted except for the one which currently has been given permission to transmit.

Occasionally, the delay count following the transmission of the data-containing signal by a particular RFID tag will time out, 100, indicating to the particular RFID tag that the network controller has not received the data-containing signal correctly from the particular RFID tag. When this happens, the particular RFID tag resends, 80, the data-containing signal to the network controller and again waits for receipt of a second acknowledgment signal.

Provision is made for the possibility that a problem between the network controller on the particular RFID tag will prevent the RFID tag from receiving acknowledgments from the network controller after the particular tag has been powered up. In tags which are powered by reception of external RF transmissions, the tags will revert to a powered off condition automatically within a predetermined time period after termination of the external RF transmissions. In such tags, the predetermined time period is determined by the time for the voltage across the terminals of energy storage capacitor 36 to decay below the threshold required to keep the tag operating. In applications where the RFID tags are powered by batteries instead of external RF transmissions, the RFID tag is provided with an additional "watchdog timer" to power off the tag in case of communication malfunction. The watchdog timer located within the RFID tag (not shown) terminates the communication sequence for that tag and powers off the tag if no acknowledgments are received within a longer predetermined time period than the predetermined delay timeout periods which follow the first and second acknowledgments.

A special type of network controller called an inventory terminal (INVT) can be used to receive and record article-identifying information for the number and type of articles which are displayed or stored. All aspects of the communication sequence remain the same with the INVT as for the POST, except that network controller commands originating from the INVT, e.g. the BEGIN signal and acknowledgment signals, do not contain a bit which identifies the command as having come from a POST, such that a disable flag will be raised in the RFID tag.

An additional type of network controller called a programmer terminal (PROGRAMMER) can be used to send and store article-identifying information to the RFID tags after the time of their manufacture. After the RFID tags are powered up, 52, and initialized, 54, by the high energy content transmission, the initial command sent by the PROGRAMMER contains a bit which indicates to the RFID tag that WRITE mode is selected, 58. The initial command also contains article-identifying information, i.e. a type-identifier and a specific article ID code. Once the RFID tag recognizes that WRITE mode is selected, 58, the article-identifying information from the command is loaded, 90, into the RFID tag's shift register, and then transferred and stored, 92, in memory located within the RFID tag.

The structure which implements the function of the RFID tag is described with reference to FIG. 4. Incoming command and acknowledgment signals, 234, which have been amplitude modulated with a binary signal code and transmitted as a wireless radio frequency (RF) signal by the network controller are received at the receiver 270. The receiver demodulates the incoming signal and passes a raw binary signal R×D, 272, to the decoder 274. The decoder recovers the received clock R×C, 220, associated with the signal and, as will be further described, regenerates the binary signal to prevent noise in the raw signal R×D, 272, from being passed to other elements within the RFID tag. The recovered clock signal R×C, 220, is used to transfer the regenerated binary signal SI, 210, into the shift register 244. Shift register 244 can be used to shift a serial binary signal, such as a request to transmit signal, RTT, or an article ID code, into encoder 236 serially to be amplitude modulated and transmitted as a wireless RF signal by the transmitter 238 to the external network controller 12. In another mode, the shift register 244 can be used to output command code data 250 from the incoming signal on a parallel output interface (not pictured as a separate element) into a type comparator 282 which compares the type-identifier in the command code 254 with a type-identifier 256 retrieved from a programmable read only memory ("PROM"), 252, within the RFID tag. The parallel output interface of the shift register is also used to output individual signal lines or pairs HOLD, 246, and ACK [2,1], 248, to the control element 200.

The control element 200 controls the sequence of operations and data flow within the RFID tag in response to the presence of internal signals within the RFID tag at a given point in time. These internal signals correspond to the RFID tag's logical "state." It will be appreciated that the control element 200 can be constructed by a read only memory having as inputs the internal signals within the RFID tag and which address, in their various combinations, locations within the memory which contain outputs of the control element which correspond to the next "state" of the RFID tag.

The random number 268 is delivered by a random number generator 266 to a comparator 286 for comparison with the output of a digital counter 264. When the two match, the RNMATCH output 310 of the comparator 286 is raised to signal the control element 200 to send the request to transmit signal. A timeout detector 289 uses the six lowest order bits [5..0] of the counter output 312 to determine when any of three particular delay counts: TIMEOUT 1, 304, TIMEOUT 2, 306, and CDET, 308 have been met or exceeded.

The RFID tag also includes a multiplexer MUX, 260, used to channel a received clock signal R×C, 220, or a transmitted clock signal T×C, 218, to the shift register 244 as SCLK, 212, under the control of clock select signal CLKSEL, 222, for use in inputting or outputting a binary signal to the shift register from the decoder or encoder, respectively. The RFID tag runs on a CLOCK, 294, provided by a 1 Mhz local oscillator 292, the output of which is divided 16 times to form the clock inputs 3TC (204) and 16RC (276) to encoder 240 and decoder 274 respectively. The 3TC clock, 204, is further divided eight times to form a clock signal running at 7.8125 kHz ("8KCLK"), 228, which is the clock signal used to increment the digital counter 264.

The decoder regenerates the raw binary signal R×D, 272, in the following manner. By use of clock input 16RC (276) the incoming raw binary signal R×D, 272, is sampled at the rate of 16 times per data bit. The samples are recorded within the decoder as low or high voltage samples. An edge detector (not shown) within the decoder is used to recover the clock signal R×C, 278, from the raw binary signal RxD, 272. Clock signal R×C, 278, is further used to determine when recording of the voltage samples for the set of 16 samples for each data bit should begin. If the number of high voltage samples in each set of 16 exceeds the number of low voltage samples then the incoming data bit is regenerated as a binary one. Otherwise, if the number of low voltage samples exceeds the number of high voltage samples, the incoming data bit is regenerated as a binary zero. The stream of regenerated binary ones and zeros are output from the decoder as SI, 210, which is the serial input to the shift register 244. Decoder input RMOD, 232, is a predetermined number which indicates the length of the incoming signal to be decoded. The value of RMOD may be programmed to permit decoding of signals of other lengths, but the programming must be done prior to the time of signal reception. When the decoder determines that it has finished decoding the signal of the appropriate length, it signals R×RDY, 312, to the control element 200 to enable further processing to proceed.

A typical communication begins as follows. The external network controller 12 such as a POST sends a high energy content transmission to the RFID tag 10. As described above, when the voltage across the energy storage capacitor 36 (FIG. 2) exceeds a minimum threshold value, the RFID tag is powered on and initialized. Exceeding the threshold raises the RESET, 290, input to the control element 200, thereby causing the control element 200 to reset elements under its control, e.g. resetting the counter 264 by means of the CRST line, permitting the local oscillator 292 to begin running, and resetting all internal signal lines within the RFID tag. The RFID tag now waits for receipt of a 'BEGIN' command from the network controller. When the BEGIN command is received at the receiver antenna 40 (FIG. 2.), the receiver demodulates the incoming amplitude-modulated RF signal, and outputs a raw binary signal R×D, 272, to the decoder. As described above, the decoder 274 outputs a regenerated binary signal containing a command code as serial input SI, 210, to the shift register 244. When the decoder 274 has finished regenerating the binary signal it raises signal line R×RDY, 312, to the control element 200. Control element, 200, then activates the shift register 244 to output the received command code over its parallel interface 250.

A portion of the received command code is held as the received type-identifier input 254 to the type comparator 282. The received type-identifier is compared to a type-identifier stored in the RFID tags which has been retrieved into LATCH 258 for comparison by the following procedure. Upon receipt of the RESET signal 290 by the control element 200 during initialization of the RFID tag, the control element has raised PROM chip select line /CS, 214, and retrieve line /RECALL, 214 to retrieve the type-identifier from its stored location in the PROM, 252. The retrieved type-identifier is stored into and held in a LATCH 258 by the signal TLATCH, 217, from the control element 200 until it is compared to the received type-identifier by the type comparator 282. When the two type-identifiers match, the TMATCH line 300 is raised. The control element 200 is programmed to react to an active TMATCH line 300 by raising the CRST line 224 to reset and start the counter 264 and by raising the SET RN line 230 to cause the random number to be generated.

The random number RN, 268, is delivered from the random number generator 266 to a latch (not shown) located within the comparator circuit 286. With each clock cycle, the comparator compares the 13 highest order bits [14..2] of the count 313, to determine if the count and the latched random number match. When the two match, the RNMATCH line 310 is raised to signal the control element 200 that the request to transmit (RTT) signal can be sent. In response thereto, the control element 200 signals the encoder 240 through TMOD 202 to output a generic, "hard-coded" RTT stored within the encoder to the transmitter 238 through the line T×D 237. This T×D signal 237 is then amplitude modulated onto an RF carrier by the transmitter 238 and transmitted on the transmitter antenna 38 (FIG. 2) as the output signal 280.

When the encoder has completed signal transmission, the TDONE line 288 is raised to notify the control element 200 of the same. If the RTT signal that was transmitted results in the network controller granting permission to transmit to the requesting RFID tag, the next command to be received by the RFID tag will be a first acknowledgment. The first acknowledgment is received as a serial binary signal as (b) generating a random number within each of said information containing data terminals following initialization in response to said begin signal;

(c) incrementing a counter in each of said information containing data terminals in response to the passage of successive time periods;

(d) comparing the random number with the count maintained by the counter during successive time periods;

(e) transmitting a request to transmit signal by said at least one information containing data terminal to the network controller when the random number in the said at least one information containing data terminal equals the count maintained by the corresponding counter in said at least one information containing data terminal; and (f) transmitting a data-containing signal to the network controller if a first acknowledgment signal, which does not specifically identify the said at least one information containing data terminal, is received by the said at least one information containing data terminal from the network controller within a predetermined time period after the said at least one information containing data terminal transmits said request to transmit signal.

2. A method of communicating between at least one information containing data terminal included in a system having a plurality of information containing data terminals and a network controller comprising the steps of:

(a) initializing each of said plurality of information containing data terminals in response to receipt of a begin signal transmitted from the network controller to each of said information containing data terminals;

(b) generating a random number within each of said information containing data terminals following initialization in response to said begin signal;

(c) incrementing a counter in each of said information containing data terminals in response to the passage of successive time periods;

(d) comparing the random number with the count maintained by the counter during successive time periods;

(e) transmitting a request to transmit signal by said at least one information containing data terminal to the network controller when the random number in the said at least one information containing data terminal equals the count maintained by the corresponding counter in said at least one information containing data terminal;

(f) generating a new random number by said at least one information containing data terminal and repeating steps (c)–(e) if a first acknowledgment signal is not received from the network controller within a first predetermined time period after the said at least one information containing data terminal transmits said request to transmit signal; and (g) transmitting a data-containing signal to the network controller if said first acknowledgment signal, which does not specifically identify the said at least one information containing data terminal, is received by the said at least one information containing data terminal from the network controller within a second predetermined time period after the said at least one information containing data terminal transmits said request to transmit signal.

3. The method according to claim 2 further comprising the steps of:

(a) temporarily suspending operation of the counter in each of said information containing data terminals if the first acknowledgment signal is received from the network controller prior to the each of said information containing data terminals transmitting a request to transmit signal; and (b) resuming operation of the counter in each of said information containing data terminals if a second acknowledgment signal is received from the network controller within a predetermined time period after suspension of operation.

4. The method according to claim 3 further comprising the step of retransmitting a data-containing signal if a second acknowledgment signal is not received from the network controller within a third predetermined time period after the said at least one information containing data terminal transmits said data-containing signal, and terminating communication if a second acknowledgment signal is received within the predetermined time period.

5. The method according to claim 4 further comprising the step of terminating communication if neither said first acknowledgment signal nor said second acknowledgment signal is received from the network controller within a predetermined time period after initialization of the said at least one data terminal.

6. The method according to claim 5 further comprising the step of powering down and permanently disabling each of the plurality of information containing data terminals if a third acknowledgment signal is received from the network controller after the second acknowledgment signal is received.

7. The method according to claim 1 wherein the mode of transmission between the plurality of data terminals and the network controller is serial, wireless radio frequency.

8. The method according to claim 1 wherein each of the plurality of data terminals is conformably attached to an article.

9. The method according to claim 1 wherein the data-containing signal contains an article identification code, said data-containing signal being read out from a memory device in each data terminal during said step of transmitting.

10. The method according to claim 2 wherein the data-containing signal contains an article identification code, said data-containing signal being read out from a memory device in each data terminal during said step of transmitting.

11. A data terminal for use in a system including a plurality of data terminals for communicating with a network controller comprising:

(a) a random number generator which generates a random number in response to a begin signal received from the network controller;

(b) a counter which increments and maintains a count in response to the passage of successive time periods;

(c) a comparator which compares the random number with the count maintained by the counter during successive time periods;

(d) a transmitter which transmits a request to transmit signal to the network controller when the random number equals the count maintained by the counter and which transmits a data-containing signal to the network controller in response to receipt of a first acknowledgment signal which does not specifically identify a particular data terminal.

12. The data terminal of claim 11 wherein the random number generator generates a new random number if the first acknowledgment signal is not received from the network controller within a predetermined time period after transmission of the request to transmit signal by the transmitter.

described above for the BEGIN command. When the first acknowledgment signal has been shifted completely into the shift register 244, the ACK1 line, 248, of the shift register's parallel output interface becomes active. The control element 200 acts upon the ACK1, 248, input in accordance with the state of other inputs, RNMATCH, 310, and CDET, 308, to determine the appropriate action to take next. For example, if ACK1, 248, and RNMATCH, 310, are active but CDET, 308, is not, the control element 200 concludes that it has received the first acknowledgment signal at the correct time. The control element then raises /RECALL, 216, with the chip select lines /CS, 214, to retrieve and output the article ID code from the PROM, 252, to the shift register 244 to be encoded and transmitted externally. However, if ACK1, 248, is received while RNMATCH, 310, is inactive, the start-suspend counter line SS, 226 is raised to stop the counter 264 from incrementing. Then, when ACK2, 248, is raised on receipt of the next second acknowledgment sent by the network controller, start-suspend counter line SS, 226, is lowered, thereby permitting the counter to resume incrementing.

If ACK1, 248, RNMATCH, 310 and CDET, 308 are all active at the same time, but TIMEOUT 1 is not, then the first acknowledgment has been received too early after the sending of the request to transmit, which indicates that a collision has occurred. It will be appreciated that CDET, 308 is held active from the time that the request to transmit or the article ID code is transmitted (as is indicated to the control element when the signal TDONE, 288 is raised) until sufficient time has elapsed to permit a response to the transmission, e.g. a first acknowledgment, to have been received.

The delay count following the sending of the request to transmit signal is maintained and checked in the following manner. With every clock cycle, the timeout detector 284 tests the six lowest order bits [5..0] of the counter output 313 to determine the elapsed time. When the delay count following the sending of the request to transmit signal is exceeded, TIMEOUT 1, 304 is raised. If ACK1, 248, is not active by that time to indicate that the first acknowledgment has been received, the control element concludes that it has not been granted permission to transmit at that time. In response to either CDET 308 or TIMEOUT 1, 304 being raised, the control element 200 raises SET RN, 230, and raises CRST, 224, momentarily to signal the random number generator 266 to generate a new random number and to restart the counter 264, respectively, in order to begin the communication sequence again. Similarly, after the RFID tag transmits the data-containing signal, the control element 200 resets the counter 264 by raising CRST, 224.

If the article-identifying information is received from the data-containing signal correctly by the network controller, the next command to be received by the RFID tag will be a second acknowledgment signal from the network controller. Receipt of the second acknowledgment will be indicated as ACK2, 248, to the control element 200. In response to ACK2, 248, the control element 200 determines if the disable flag has been raised 84 (FIG. 3). This disable flag is a bit stored in a bit-storing device, e.g. a latch or a "flip-flop" (not shown) located in the control element 200. The status of the disable flag is dependent on whether the command code sent by the network controller at the beginning of the communication session contains a bit that indicates that the network controller is a POST. If the disable flag has not been raised, the communication is terminated upon receipt of the second acknowledgment, and the RFID tag waits for the network controller to power it down, i.e., to discontinue sending the high energy content RF signal. If the disable flag has not been raised, thus indicating that the network controller is a POST, the RFID tag remains active until receipt of a third acknowledgment ACK3, 302.

After sending the data-containing signal, the RFID tag again maintains and checks a delay count while waiting for receipt of a second acknowledgment signal. If the second acknowledgment signal has not been received before the delay count is exceeded, TIMEOUT 2, 306, is raised. The control element 200 then raises the RECALL, 216, and /CS, 214, inputs to the PROM, 252, to begin transmitting the data-containing signal again to the network controller.

Once the article-identifying information has been received correctly by the network controller for all the RFID tags, the network controller sends a third acknowledgment which causes line ACK3, 302, in the RFID tag to become active. The ACK3 signal, 302, causes the RFID tag to become disabled from further communication with the network controller. For tags used in a supermarket checkout system, permanent disablement may be accomplished through a switch (not shown) located in the PROM, 252, which is operable by the control element 200 upon receipt of ACK3, 302, to short circuit the terminals of energy storage capacitor 36 (FIG. 2).

For tags used in applications where reusability is desired, such as on clothing sold in retail department stores, an effective disabling mechanism can be provided which is reversible at a later time by a PROGRAMMER type network controller. For such applications, the RFID tag can be provided with a switch (not shown), again located in the PROM, 252, which is operable by the control element 200 upon receipt of ACK3, 302, to disable transmissions from the RFID tag, but which does not affect reception by the tag of incoming commands. Such a switch may be provided by a latch in the PROM, 252, which, when in the 'disable' state, causes the control element 200 or to hold start-suspend counter line SS, 228, in the suspend state, or, hold encoder control inputs TMOD, 202, in a transmission-disabled condition. The PROGRAMMER network controller can then be used at a later time to "flip" the switch of the disabled tag, i.e. to reset the latch in the PROM, 252, to the fully enabled state, to permit the RFID tag to transmit responses to the network controller again.

It will be appreciated that the data terminal of the present invention can be put to many uses besides that of an RFID tag attached to articles for use in a supermarket checkout system. By example and without intending to be limiting, among the uses to which the data terminal is adapted are: airwave or network data communications in general; telemetry; retail sales in general; delivery control; inventory control; automatic toll collection, speed checking or identification of vehicles on a highway; identification of and the locating of persons, animals, or component parts or stock items and the like which occupy, enter, or leave a defined area. Furthermore, these and other modifications of the invention will be readily apparent to those skilled in the art in light of the description of the preferred embodiments set forth herein without departing from the spirit and scope of the invention which is set forth in the appended claims.

What is claimed is:

1. A method of communicating between at least one information containing data terminal included in a system having a plurality of information containing data terminals and a network controller comprising the steps of:

(a) initializing each of said plurality of information containing data terminals in response to receipt of a begin signal transmitted from the network controller to each of said information containing data terminals;

13. A system for communicating information comprising:
at least one first information containing data terminal and a second terminal, said at least one first information containing data terminal including:
- a random number generator which generates a random number in response to a begin signal received from the second terminal;
- a counter which increments and maintains a count in response to the passage of successive time periods;
- a comparator which compares the random number with the count maintained by the counter during successive time periods;
- a first transmitter which transmits a request to transmit signal to the second terminal when the random number in the said at least one first information containing terminal equals the count maintained by the counter, and which transmits a data-containing signal to the second terminal in response to receipt of a first acknowledgment signal which does not specifically identify the said at least one first information containing data terminal after transmitting the request to transmit signal;

said second terminal including:
- a second transmitter which transmits said begin signal to said at least one first information containing terminal, and which transmits said first acknowledgment signal in response to receipt of said request to transmit signal from the said at least one first information containing data terminal; and
- a receiver which receives said request to transmit signal and said data-containing signal transmitted to said second terminal from the said at least one first information containing data terminal.

14. The system of claim 13 wherein said second transmitter transmits a second acknowledgment signal in response to receipt of said data-containing signal from said at least one first information containing data terminal.

15. The system of claim 14 wherein said second transmitter transmits a third acknowledgment signal in response to receipt of said data-containing signal from each of the said at least one first information containing terminals to which the second terminal transmitted the begin signal.

16. The system of claim 13 wherein said second transmitter transmits an information containing signal to be stored in a memory within each of said at least one first information containing data terminals.

* * * * *